(12) United States Patent
D'Amelia (10) Patent No.: US 10,489,724 B2
(45) Date of Patent: Nov. 26, 2019

(54) PREDICTING RESOURCES REQUIRED BY A CUSTOMER AND THEIR COST

(71) Applicant: FERRANDINO & SON INC., Farmingdale, NY (US)

(72) Inventor: Philip D'Amelia, Nesconset, NY (US)

(73) Assignee: FERRANDINO & SON INC., Farmingdale, NY (US)

(*) Notice: Subject to any disclaimer, the term of this patent is extended or adjusted under 35 U.S.C. 154(b) by 594 days.

(21) Appl. No.: 14/701,987

(22) Filed: May 1, 2015

(65) Prior Publication Data

US 2015/0317588 A1 Nov. 5, 2015

Related U.S. Application Data

(60) Provisional application No. 61/987,734, filed on May 2, 2014.

(51) Int. Cl.
| | |
|---|---|
| *G06Q 10/00* | (2012.01) |
| *G06Q 30/00* | (2012.01) |
| *G06Q 50/00* | (2012.01) |
| *G06Q 10/06* | (2012.01) |
| *G06Q 50/10* | (2012.01) |
| *G06Q 30/02* | (2012.01) |

(52) U.S. Cl.
CPC ....... *G06Q 10/06* (2013.01); *G06Q 10/06315* (2013.01); *G06Q 30/0283* (2013.01); *G06Q 50/10* (2013.01)

(58) Field of Classification Search
CPC .............. G06Q 10/06315; G06Q 10/00–50/00
See application file for complete search history.

(56) References Cited

U.S. PATENT DOCUMENTS

| | | | | |
|---|---|---|---|---|
| 5,550,349 | A * | 8/1996 | Bomba | E04B 7/163 219/213 |
| 7,421,344 | B1 * | 9/2008 | Marsh | G01W 1/02 702/3 |
| 2002/0140959 | A1 * | 10/2002 | Harper | G06F 3/1207 358/1.13 |
| 2003/0182413 | A1 * | 9/2003 | Allen | G06Q 30/06 709/223 |
| 2007/0136190 | A1 * | 6/2007 | Engle | G06Q 20/102 705/40 |
| 2007/0193072 | A1 * | 8/2007 | Fox | E01B 19/00 37/199 |
| 2009/0070159 | A1 * | 3/2009 | Ahvenainen | G06Q 30/02 705/7.33 |
| 2011/0029110 | A1 * | 2/2011 | Hohl | H04N 21/812 700/94 |

(Continued)

*Primary Examiner* — Alan S Miller
*Assistant Examiner* — Mustafa Iqbal
(74) *Attorney, Agent, or Firm* — F. Chau & Associates, LLC (57) ABSTRACT

A method to manage a service provided to a customer includes: enabling, by a processor of a computer system, a user to manually select for a customer, one of a plurality of categories of contracted services stored in the system, determining, by the processor, whether the selected category is affected by an environmental event, and predicting, by the processor, dynamic resources required to provide the service based on the environmental event and the selected category when it is determined that the selected category is affected by the environmental event.

17 Claims, 6 Drawing Sheets

(56) References Cited

U.S. PATENT DOCUMENTS

| | | | |
|---|---|---|---|
| 2011/0106727 A1* | 5/2011 | Noyes | G06Q 40/06 705/36 R |
| 2013/0024336 A1* | 1/2013 | Jones, Jr. | G06Q 30/06 705/34 |
| 2014/0108078 A1* | 4/2014 | Davis | G06Q 10/063112 705/7.14 |

* cited by examiner

Cat-A - Automated Work Order Code Event Rules

Available Rules

| Use | Greater Than or Equal To | Less Than or Equal To | Quantity | Create Multiple Events |
|---|---|---|---|---|
| ▶ | 4 | 5.9 | 1 | Yes |
| ▶ | 6 | 7.9 | 1 | Yes |
| ▶ | 8 | 9.9 | 1 | Yes |
| ▶ | 10 | 11.9 | 1 | Yes |
| ▶ | 12 | 13.9 | 2 | Yes |
| ▶ | 14 | 15.9 | 2 | Yes |
| ▶ | 26 | 26.9 | 2 | Yes |
| ▶ | 28.1 | 29 | 3 | Yes |
| ▶ | 16 | 17.9 | 2 | Yes |
| ▶ | 18 | 19.9 | 2 | Yes |
| ▶ | 20 | 21.9 | 2 | Yes |
| ▶ | 22 | 23.9 | 2 | Yes |
| ▶ | 24 | 24.9 | 2 | Yes |
| ▶ | 25 | 25.9 | 2 | Yes |
| ▶ | 1.1 | 1.9 | 1 | Yes |
| ▶ | 38.1 | 39 | 1 | Yes |
| ▶ | 1.1 | 1.9 | 2 | Yes |
| ▶ | 1.1 | 1.9 | 4 | No |

FIG. 6

PREDICTING RESOURCES REQUIRED BY A CUSTOMER AND THEIR COST

CROSS-REFERENCE TO RELATED APPLICATION

This application claims priority to U.S. Provisional Application Ser. No. 61/987,734 filed on May 2, 2014, the disclosure of which is incorporated by reference in its entirety herein.

BACKGROUND OF THE INVENTION

1. Technical Field

The present disclosure relates generally to prediction of resources required by a customer and their cost, and more particularly to prediction of the resources by considering environmental factors and generation of corresponding invoices.

2. Discussion of Related Art

Businesses that require services such as landscaping, snow removal, electrical repair, construction, plumbing, etc., often use outside parties to provide these services. For example, a customer could have separate contracts with a private landscaping company, a snow removal company, a plumber, an electrician, etc., or a contract with a company that provides multiple such services. Some of the services may be constant, such as routine grass cutting, while other services may be more dynamic based on unexpected events. The invoice (bill) for a subsequent week or month can be calculated easily when only constant services are provided. Thus, a customer requesting such constant services has an adequate estimate of the costs of these constant services, and a business providing such services can easily estimate the resources needed to provide these constant services (e.g., the number of lawnmowers, number of bags of fertilizer, etc.). However, since some services are triggered by uncertain events, it can be difficult for a business to determine the true cost of the services it will need, and difficult for business providing such dynamic services to estimate the resources needed to provide these dynamic services.

Thus, there is a need for a mechanism to predict resources required by customers and their cost.

SUMMARY OF THE INVENTION

According to an exemplary embodiment of the invention, a method to manage a service provided to a customer includes: enabling, by a processor of a computer system, a user to manually select for a customer one of a plurality of categories of contracted services stored in the system; determining, by the processor, whether the selected category is affected by an environmental event; and predicting, by the processor, dynamic resources required to provide the service based on the environmental event and the selected category when it is determined that the selected category is affected.

According to an exemplary embodiment of the invention, a computer system for managing services provided to customers includes: a server comprising a memory storing a computer program and a processor executing the computer program, where the computer program of the server is configured to enable a user to manually select one of a plurality of categories of contracted services of a customer, determine whether the selected category is affected by an environmental event, and predict dynamic resources required to provide the service based on the environmental event and the selected category when it is determined that the selected category is affected.

According to an exemplary embodiment of the invention, a method for predicting an amount of a resource to be used to perform a snow removal includes: a processor of a computer system executing a software function of the system that retrieves a weather report from across a network for a given location and future date; the processor extracting a snow fall amount from the weather report; the processor retrieving a rule stored in the system associated with the snow fall amount listing a first amount of a resource; the processor sending a report to a user listing the first amount; the processor retrieving a second amount of the resource recorded after the sending of the report; and the processor updating the first amount of the rule based on the first amount and the second amount.

BRIEF DESCRIPTION OF THE DRAWINGS

Exemplary embodiments of the invention can be understood in more detail from the following descriptions taken in conjunction with the accompanying drawings in which.

DETAILED DESCRIPTION

Exemplary embodiments of the invention are discussed in further detail with reference to FIGS. 1-6. This invention may, however, be embodied in different forms and should not be construed as limited to the embodiments set forth herein.

It is to be understood that the systems and methods described herein may be implemented in various forms of hardware, software, firmware, special purpose processors, or a combination thereof. In particular, at least a portion of the present invention may be implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures may be implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 1:
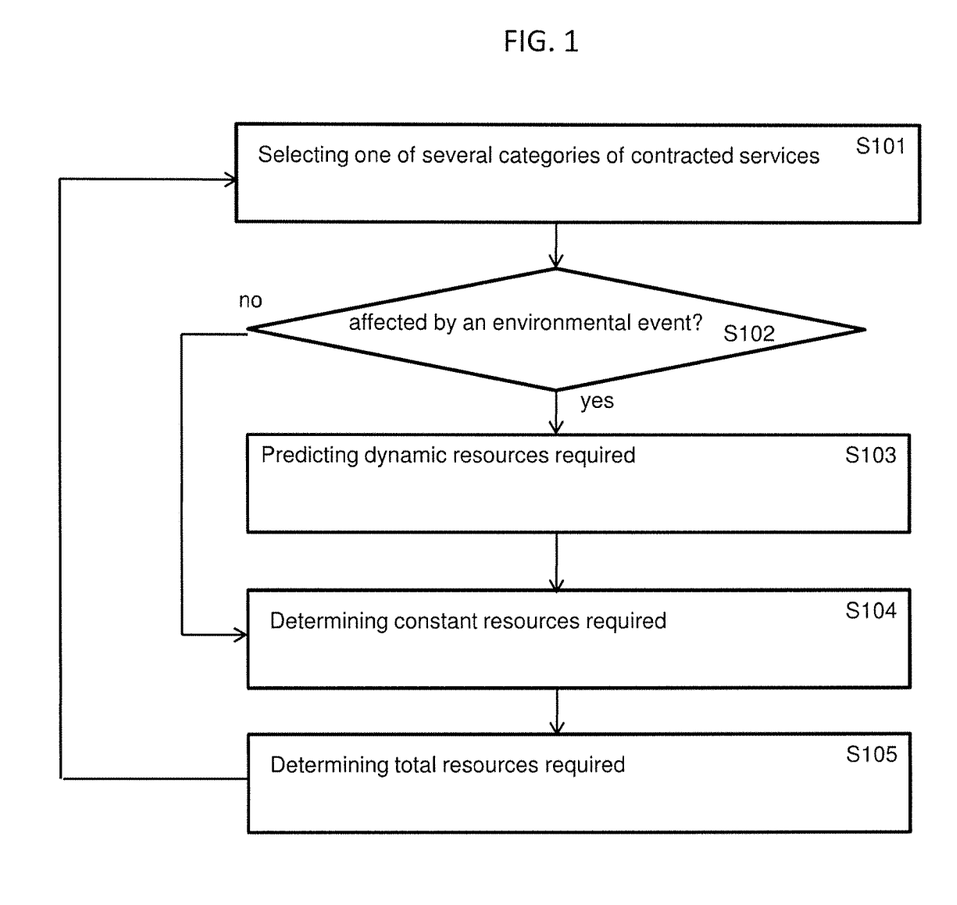
FIG. 1 illustrates a method of predicting services required by a business according to an exemplary embodiment of the invention.
Figure 2:
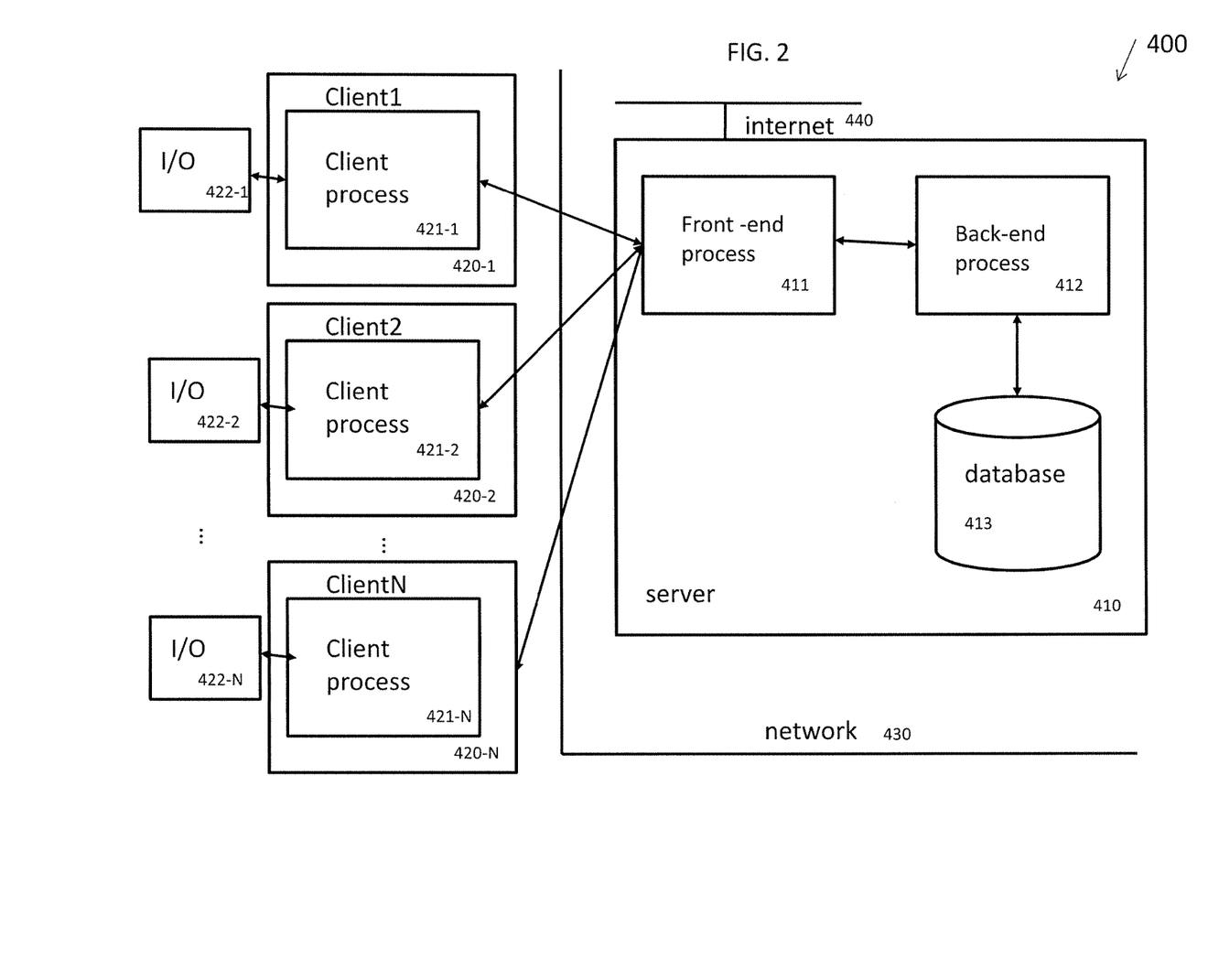
FIG. 2 illustrates a system according to an exemplary embodiment of the invention, in which the method of FIG. 1 may be executed.

FIG. 1 illustrates a method of predicting resources required by a customer, according to an exemplary embodiment of the invention. FIG. 2 illustrates a system 400 according to an exemplary embodiment of the invention that may execute the method of FIG. 1. The method of FIG. 1 will be discussed below with respect to the system 400 of FIG. 2.

Referring to FIG. 1, the method includes selecting one of several categories of contracted services of a customer (S101), determining whether the selected category is affected by an environmental event (S102), predicting dynamic resources required based on the environmental event and the selected category when it is determined that the selected category is affected (S103), determining constant resources required based on the selected category (S104), and determining total resources required from determined and predicted resources (S105). The method of FIG. 1 may repeated for each different category of service provided to the customer, and repeated for each different customer that is being managed by server 410.

For example, the categories of contracted services may include snow removal, landscaping (e.g., grass cutting, hedge trimming, planting, leaf removal), electrical repair/modification (e.g., fixing light fixture, replacing bulbs, adding new circuits, etc), plumbing, cleaning (e.g., carpet cleaning, trash removal), construction, etc. Please note the inventive concept is not limited to the categories listed above.

Database 413 may include a customer table for each customer that identifies the customer, lists all of the categories of contracted services, and the costs of these services. For example, the customer table may identify the name and address of the customer, the geographic boundary or location (e.g., latitude/longitude) of the customer or lot, the size of a lot, the zipcode of the address, etc. Each customer may have contracted for different serviced and at different rates. For example, one customer table could indicate that a first customer has contracted to receive lawn cutting and snow removal services, while another customer has contracted to receive electrical maintenance and snow removal services. The customer table may indicate the cost for each resource used on behalf of the customer to satisfy the contracted service (e.g., $2 for each pound of salt/sand, $500 for each plow, $8 for each pound of fertilizer, etc.) The customer table need not be a single table as the information stored therein may be stored in one or more related tables. The database 413 may be a relational database as an example.

The determination of whether the selected category is affected by an environmental event (e.g., see S101) may include determining whether the selected category for a corresponding customer is affected by the weather. This determination may be made by referring to a table in database 413 that stores for each contracted category of service an indication that indicates if weather is to be considered. For example, if the customer is contracted to receive categories of service such as electrical maintenance, grass cutting, and snow removal, the table could indicate that weather is not to be considered for the electrical maintenance or the grass cutting, but is to be considered for the snow removal.

Once it has been determined that the selected category of service is affected by the environmental event, the predicting of the dynamic resources (e.g., see S102) may include server 410 performing internet searches across the internet 440 for weather reports affecting the lot(s) of the customer. For example, the searches may include searching one or more websites such as www.accuweather.com, www.intellicast.com, www.wunderground.com, www.noao.gov, www.weatherbug.com, etc., for weather reports using geographical information about the customers (e.g., zipcode, latitude/longitude, town, etc.). In another embodiment, the weather reports come from a subscription based WEB service (e.g., WEATHER CENTRAL), which each site subscribes to and is based on the location (e.g., lat/lon) of the site. A weather report is generated based on a requested location (e.g., lat/lon). The system can periodically request weather reports for each site it controls and stores/updates the corresponding weather reports. Please note, the inventive concept is not limited to the above described websites. The searching may search for weather predictions over any timeframe (e.g., the next hour, next 4 hours, the next day, three days from now, next week, next month, etc.). The server 410 can extract any needed information from the search results, such as expected snowfall amount, expected rainfall amount, probability of rain/snow, temperature, pressure, etc. In an exemplary embodiment, multiple forecasts at different times are done for the forecasted day, and then the results are averaged together to generate the estimated forecast. For example, if we assume it is Saturday, a morning forecast is made at 6 am for Wednesday and an evening forecast at 6 pm is made for Wednesday, and an average predicted snowfall is calculated from the two forecasts. The revenue or the cost of providing a service (e.g., snow removal) based on the predicted snowfall may be based on rules that are setup for each account that state what work order codes would be triggered based upon the amount of snow that has fallen. We then take the final snow totals that had actually fallen for a particular weather event and then compare the actual work codes against the predicted ones to get a better handle on the differences. These differences can be used to fine tune the rules as it pertains to the actual snowfall. For example, if 5 inches of snow has fallen, and the current rule for 5 inches of snow indicates a single work order code for a 100 pound bag of sand, and the work order codes actually used in the actual snow removal required 2 work order codes or 200 pounds of sand/salt, then the rule for 5 inches of snow could be updated to specify that two work order codes (e.g., 200 pounds of sand/salt) are required. Thus, the next time a 5 inch snow fall weather event is predicted, the system would predict that 200 pounds of sand/salt is required.

Figure 3:
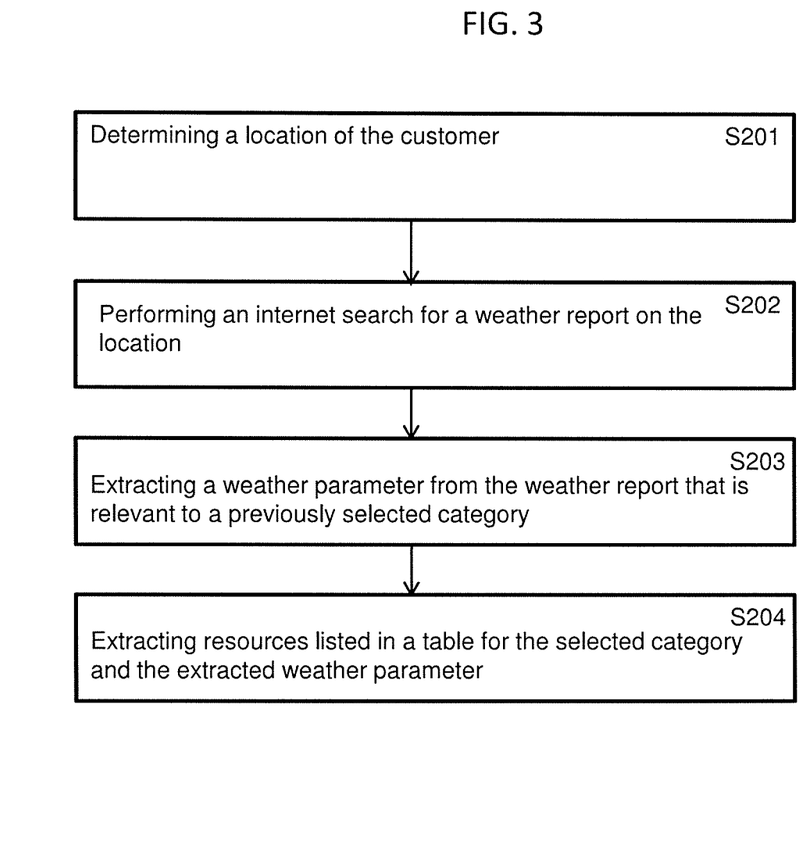
FIG. 3 illustrates a method of predicting dynamic resources according to an exemplary embodiment of the invention that may be used in the method of FIG. 1.

FIG. 3 illustrates a method of predicting the dynamic resources according to an exemplary embodiment of the invention that may be used as step S103 in the method of FIG. 1. Referring to FIG. 3, the method includes determining a location of the customer (S201), performing an internet search for a weather report on the location (S202), extracting a weather parameter from the weather report that is relevant to the previously selected category (S203), and extracting resources listed in a table for the selected category and the extracted weather parameter. For example, if the previously selected category is snow removal and the system associates this category with a snowfall depth parameter, the system would extract the predicted snow fall depth from the weather report. The table could list different resources (e.g., pounds of sand/salt, number of plows, number of shovels, number of employees, etc.) required for various snowfall depth ranges so that the one that matches the extracted predicted snow fall depth can be extracted as the required dynamic resources.

Further, instead of, or in addition to performing a search for the weather reports, the server 410 may refer to external or internally stored almanacs, which can be used to predict weather for a certain location on a given day. For example, the almanac may indicate the average snow fall of a given day/week/month over a given period of years (e.g., last 100 years), and this data can be used to estimate one of various weather parameters (e.g., amount of snow fall, amount of rain fall, temperature, etc.) that will occur during a given day or over a given week/month.

The database 413 may include a table that lists the resources required for each category of service based on different variations in environmental data (e.g., see Table 1 below).

TABLE 1

| Snow fall | Plows per acre | Salt per acre | Sand per acre |
|---|---|---|---|
| 1-2 inches | 1 | 0 pounds | 50 pounds |
| 2-4 inches | 1 | 50 pounds | 100 pounds |
| 5-10 inches | 2 | 150 pounds | 200 pounds |
| 10 inches-2 feet | 3 | 300 pounds | 400 pounds |

For example, if a customer is contracted to receive snow removal services, and the location of their 1 acre lot is within the bounds of a weather forecast that indicates a snow fall of 3 inches is expected, the server 410 would predict that 1 plow, 50 pounds of salt, and 100 pounds of sand should be set aside for the customer. If the size of the lot were 2 acres, the server 410 set aside 2 plows, 100 pounds of salt and 200 pounds of sand.

There may also be additional resources that are required that do not depend on variations in the weather. For example, all snow removal services may require a GPS, road flares, a flashlight, hazard cones, etc. The database 413 may store a table that lists a set of constant resources that are used with the corresponding category of service. Thus, the determination of the constant resources (e.g., S104) may refer to this table to determine the corresponding constant resources.

The determined total resource (e.g., see S105) includes both the predicted dynamic resources, if any, and the determined constant resources, if any. For example, if the selected category of service were grass cutting instead of snow removal, step 102 could have determined that weather is not to be considered, and the method would have proceeded directly to step S104. For example, the database 413 may store a table that lists the corresponding constant resources that are used in the weekly grass cutting of a particular customer such as the number of bags of fertilizer, number of lawnmowers, the amount of lawnmower fuel, etc.

An estimated invoice may be calculated based on the predicted dynamic services and the constant services. Constant services are typically provided with a fixed cost. For example, a customer could be charged a constant amount a week for grass cutting (e.g., a constant service), but their snow removal invoice could vary depending on the resources used (e.g., a dynamic service). Thus, the resources predicted to be needed during a dynamic service can be used to adjust the invoice, whereas the resources used during a constant service with a fixed cost need not be considered in calculating the invoice.

The estimated invoice includes the fixed costs of the constant services and the costs associated with the dynamic services. For example, if we are calculating a weekly invoice for a customer in June, it could include a fixed $500 charge for grass cutting, whereas if we are calculating weekly invoice for a customer in December, it could include a fixed charge and dynamic charges. For example, the fixed charge may be a base cost for providing snow removal for the week, and the additional cost for each resource the customer was predicted to need. For example, if customer 1 is expected to receive 3 inches of snow, and has contracted to be charged a base price of $500 for snow removal, $200 for each plow, $2 for each pound of salt, $1 for pound of sand, and has a 1 acre lot, the estimated invoice would sum to ($500+$200*1+$2*50+$1*100)=$900.

The database 413 may include a table that keeps track of the available resources that are in stock. The server 410 may refer to the table to determine whether it has sufficient resources to handle the estimated demand. If sufficient resources are not available, the server 410 can send a notification to a user that indicates that not enough resources are available (e.g., short by 50 pounds of salt, not enough lawn mowers). For example, the notification can be a message displayed on a display of one of the input/output units 422-1, 422-2, . . . , 422-N, a text message to a smartphone, an email, etc. The user can then take corrective action (e.g., acquire additional salt, purchase more lawn-mowers), and use a client process (e.g., 421-1, 421-2, . . . , 421-N) on a client computer (e.g., 420-1, 420-2, . . . , 420-N) attached to the server 410 through network 430 to update the table of resources.

The estimated invoice can be stored in database 413 and sent electronically to the customer (e.g. via email) from the server 410. This way, the customer has a rough idea of what the cost of the services provided for a subsequent day/week/month will be. The estimated invoice need not be the same as the actual invoice. For example, if it turns out that a smaller amount of snow actually fell in the customer's lot, it may not be necessary to use all the predicted resources, or if a greater amount of snow actually fell, it may be necessary to use more than the predicted amount of resources. Thus, after the service has been actually provided, the user can log the actual amounts of each resource used on behalf of the given customer using the client process (e.g., 421-1) of a client machine (e.g., 421-1). This logging may include the client process sending a computer message to the front-end process 411 identifying the customer (e.g., a customer identifier), the service provided (e.g., snow removal), the date of the service, the invoice number of the estimated invoice, etc. The front-end process 411 can extract the required data from the message for output to the back-end process 412, which can be used to produces the actual invoice. The back-end process 412 can create the actual invoice by adjusting the estimated invoice based on the extra used or unused resources. The server 410 may send the actual invoice to the customer (e.g., by email) or print out the invoice using a printer of one of the I/O devices 422-1, 422-2, . . . , 422-N of the client computers 420-1 . . . 420-N.

The weather searching described above may be performed periodically for all zones controlled by the server 410, and the results of the weather searching may be stored in database 413. A zone may represent the geometric boundary of a given customer. When there is a new customer, the number of zones controlled by the server 410 may increase. If an existing customer contracts to have another one of its lot handled, then the size of the zone of that customer may be increased, or an additional zone may be assigned to the customer. If an existing customer cancels its contract, then the zone of that customer may be deleted. If an existing customer adjusts its contract so one less lot is handled, the size of its zone will decrease according. Thus, the weather searching performed is dynamic based on the given number of zones handled, their sizes, and their locations. The database 413 may store a table listing all of the zones being handled, the geographic boundaries of the zones, and identify the customers corresponding to each of the zones.

The weather searching may be performed based on zip code or town as many of the zones may fall within the same zip code or town. Thus, instead of performing the weather searching for each zone based on its geographic boundaries, the number of distinct zip codes or towns among all of the managed zones may be determined, and the weather searching can be performed only for the distinct zip codes/towns.

While the above has described prediction of dynamic services primarily with respect to snow removal, the inventive concept is not limited thereto. For example, there are other services that me affected by environmental factors. For example, during especially raining seasons, it may be necessary to cut lawns more often or perform water pumping services, during especially dry seasons, it may be necessary to provide more irrigation services, during especially hot weather, it may be necessary to provide more air conditioning maintenance services, during especially cold weather events, it may be necessary to provide more towing services, battery jumping services, boiler repair services, oil delivery services, etc.

The server 410 can manage customer accounts to enable a customer to view their actual and estimated invoices. For example, a customer can use a local computer to login to the server 410 via the internet 440 to view its invoices.

Figure 4:
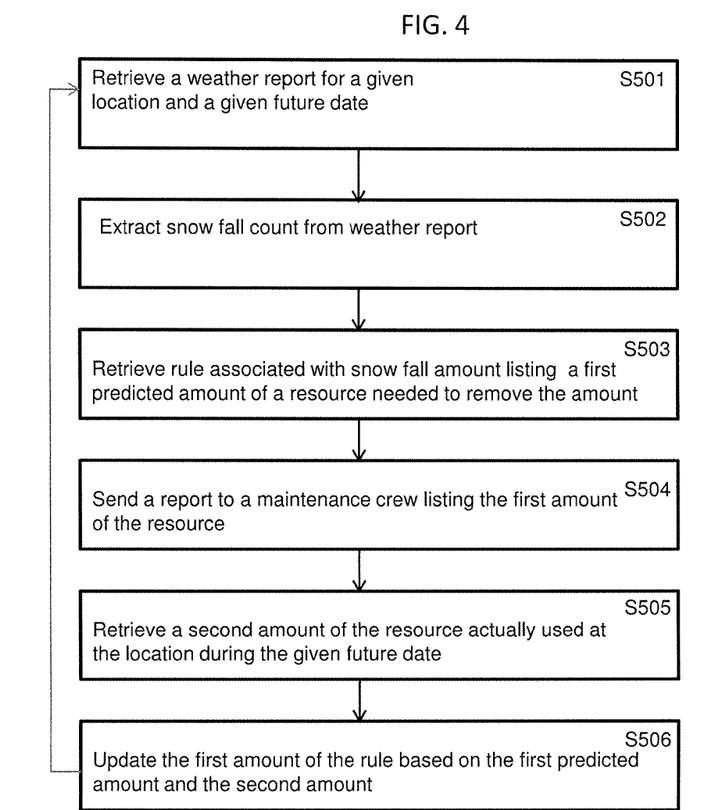
FIG. 4 illustrates a method for predicting a resource needed to perform a snow removal according to an exemplary embodiment of the invention.

FIG. 4 illustrates a method for predicting an amount of resources required to remove snow according to an exemplary embodiment of the invention. The method includes retrieving a weather report for a given location and given future date (S501). For example, the location could be a lat/lon of a site of a customer, and if the current day is Monday, the future date could be Tuesday. The method next includes extracting a snow fall amount from the weather report (S502). For example, the weather report may indicate that a certain number of inches of snow are predicted to fall on the given future date for the location. The method next includes retrieving a rule from the system associated with the snow fall amount listing a first predicted amount of a resource needed to remove the amount (S503). For example, assume the resource is a certain amount of sand, salt, shovels, workers, plows, etc. Next, the method includes sending a report to a maintenance crew or manager listing the predicted amount of the resource (S504). For example, the system can send a computer formatted message (e.g., a text message, and email, a social network message) listing the predicted amount to a computer (e.g., tablet, smartphone, etc.) of a user within the crew.

It is then assumed that the crew has gone to the site on the future date to remove the snow, and has used the predicted amount of the resource as a guide for stocking their truck with the resource to aid in the snow removal. For example, the predicted snow fall is 3 inches and the corresponding amount of the resource is 100 pounds of salt, and the crew brings 150 pounds of salt to the site. When the crew completes the snow removal, it can send a report indicating how much of the resource was actually used (i.e., a second amount). For example, the crew can call/text/email a manager the actual amount and the manager can enter into the system the second amount of the resource actually used at the location. Then the system can retrieve the second amount used (S505) and update the first amount using first amount and the second amount or just the second amount (S506). For example, if the actual amount used was 120 pounds, the system could average the first and second amounts together and update the rule for 3 inches of snow to specify that 110 pounds should be used. Alternately, the previous amount of the resource associated with the rule for 3 inches can be replaced with the second amount. The method can then be repeated as many times as desired so the rules can be refined dynamically.

Figure 5:
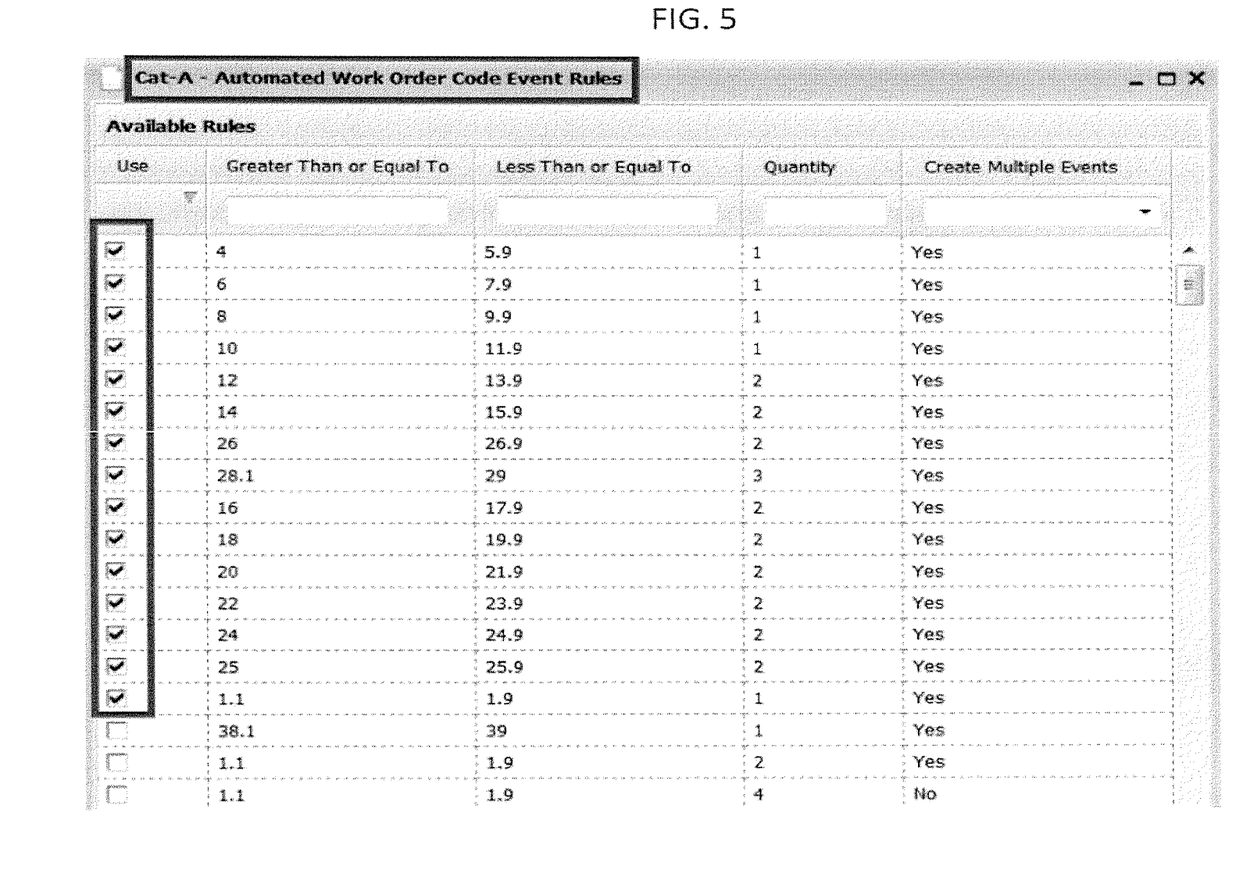
FIG. 5 illustrates an example of a graphical user interface that can be used to generate and select rules associated with a given maintenance activity.

FIG. 5 show an example of a graphical user interface that can be used by a user of the system to create rules for a given event (e.g., snow removal) and specify which rules are to be enabled for the given event. For example, the circled rules are enabled for the event and other rules are disabled for the event. Each rule specifies a different environmental factor range (4-5.9 inches of rain/snow fall, 6-7.9 inches of rain/snow fall, etc.), and a quantity of a certain resource (e.g., 3 pounds of sand, 1 pound of salt, 3 shovels, 2 plows, etc.). The quantity can be manually updated by a supervisor and updated automatically by the system using the method of FIG. 4.

Figure 6:
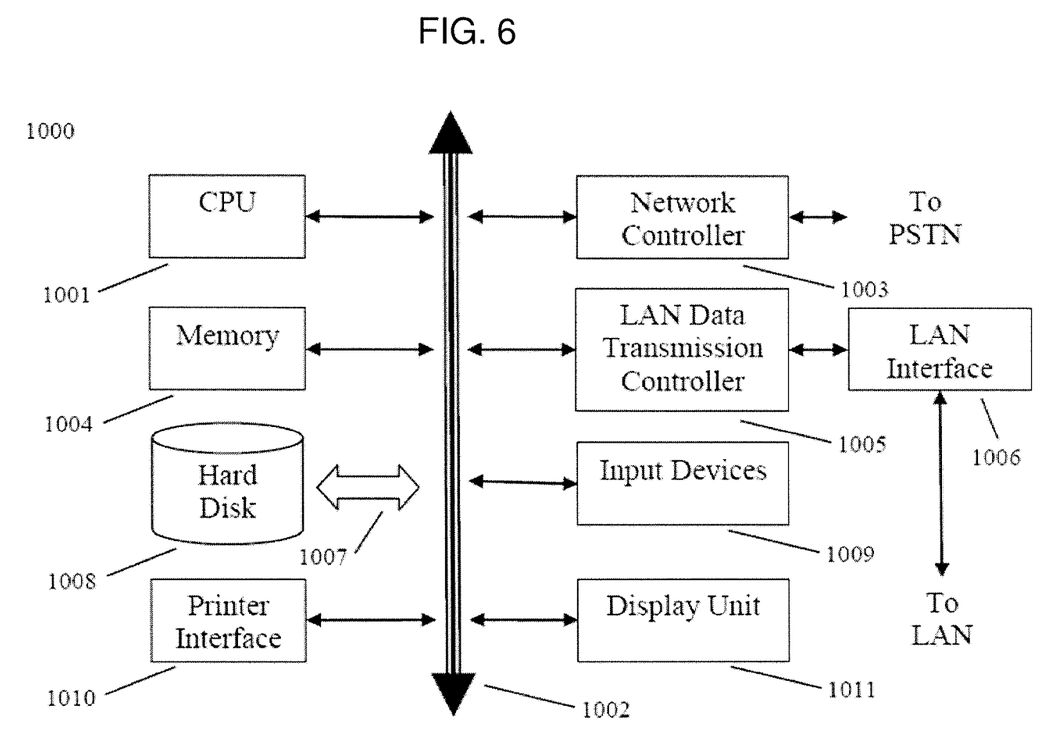
FIG. 6 illustrates a system according to an exemplary embodiment of the invention, in which the method of FIG. 1 may be executed.

FIG. 6 shows an example of a computer system, which may implement the methods and systems of the present disclosure. The system and methods of the present disclosure, or part of the system and methods, may be implemented in the form of a software application running on a computer system, for example, a mainframe, personal computer (PC), handheld computer, server, etc. For example, the method of FIG. 1, FIG. 3, or FIG. 4 may be implemented as software application(s). These software applications may be stored on a computer readable media (such as hard disk drive memory 1008) locally accessible by the computer system and accessible via a hard wired or wireless or wireless connection to a network, for example, a local area network, or the Internet. For example, the server 410 shown in FIG. 2 may correspond to the computer system shown in FIG. 6.

The computer system referred to generally as system 1000 may include, for example, a central processing unit (CPU) 1001, a GPU (not shown), a random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007. CPU 1001 may be the computer processor that performs some or all of the steps of the method described above with reference to FIG. 1, FIG. 3 and FIG. 4.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention.

What is claimed is:

1. A method to manage a service provided to a customer, the method comprising:

enabling, by a processor of a computer system, a user to manually select for a customer, one of a plurality of categories of contracted services stored in the system;

displaying, by the processor, a graphical user interface including a plurality of rows, where each row represents a rule to be applied when providing one of the categories of contracted services, where each row includes a first field selectable by a user to indicate whether the corresponding rule is enabled for the selected one category of contracted services, a second field editable by a user to enter a weather amount range, and third field editable by a user to enter an initial quantity of a physical resource to be applied by a human being during the selected one category of contracted services that is dependent on weather;

performing, by the processor, a search on the Internet for a weather report of the weather based on a location of the customer;

extracting, by the processor, a weather parameter from the weather report that is relevant to the selected one category of contracted services, the weather parameter indicating an expected weather amount;

extracting, by the processor, the initial quantity from the third field of one of the rows whose first field indicates the corresponding rule is enabled and whose second field has a weather amount range encompassing the expected weather amount;

updating, by the processor, the initial quantity in the third field of the one row based on a value of the extracted initial quantity and a new value entered into a client process of the system that indicates an actual quantity of the physical resource used to complete the selected one category of contracted services;

referencing, by the processor, a table of the system to determine whether available resources are sufficient to provide the updated initial quantity; and sending, by the processor, an electronic notification message when it is determined that the available resources are not sufficient.

2. The method of claim 1, further comprising determining the location of the customer by the processor referring to a customer table of the customer fisting a geographical location or a zip code, wherein the customer table is stored in the system.

3. The method of claim 1, wherein the selected contracted service is snow removal and the expected weather amount is an expected amount of snow fail.

4. The method of claim 1, further comprising, prior to the updating, determining physical resources needed to support the one selected contracted service from a customer table of the system associated with the customer storing the selected one enabled rule.

5. The method of claim 1, further comprising, prior to the updating, generating an estimated invoice based on the initial quantity of the physical resource.

6. The method of claim 5, wherein generating the estimated invoice comprises:

the processor referring to a table listing a contracted price for the initial quantity, the table stored within the system; and generating the estimated invoice listing the initial quantity and the contracted price.

7. The method of claim 5, further comprising sending the estimated invoice electronically to the customer.

8. The method of claim 5, further comprises:

adjusting the estimated invoice to reflect the actual quantity used; and generating an actual invoice based on the adjusting.

9. The method of claim 1, wherein the updating comprises averaging the value of the initial quantity with the new value and setting the value of the initial quantity to a result of the averaging.

10. The method of claim 1, wherein the performing of the search comprises performing the search for the weather report at a first time to determine a first weather amount, performing the search for the weather report at a second later time to determine a second weather amount, and setting the expected weather amount to an average of the first and second weather amounts.

11. A computer system for managing services provided to customers, the system comprising:

a server comprising a memory storing a computer program and a processor executing the computer program, wherein the computer program of the server is configured to:

enable a user to manually select for a customer, one of a plurality of categories of contracted services stored in the system;

display a graphical user interface including a plurality of rows, where each row represents a rule to be applied when providing one of the categories of contracted services, where each row includes a first field selectable by a user to indicate whether the corresponding rule is enabled for the selected one category of contracted services, a second field editable by a user to enter a weather amount range, and third field editable by a user to enter an initial quantity of a physical resource to be applied by a human being during the selected one category of contracted services that is dependent on weather;

perform a search on the Internet for a weather report of the weather based on a location of the customer;

extract a weather parameter from the weather report that is relevant to the selected one category of contracted services, the weather parameter indicating an expected weather amount;

extract the initial quantity from the third field of one of the rows whose first field indicates the corresponding rule is enabled and whose second field has a weather amount range encompassing the expected weather amount;

update the initial quantity in the third field of the one row based on a value of the extracted initial quantity and a new value entered into a client process of the system that indicates an actual quantity of the physical resource used to complete the selected one category of contracted services;

reference a table of the system to determine whether available resources are sufficient to provide the updated initial quantity; and send an electronic notification message when it is determined that the available resources are not sufficient.

12. The computer system of claim 11, wherein the server determines the location of the customer by referring to a customer table for the customer stored in the memory listing a geographical location or a zip code.

13. The computer system of claim 11, wherein the selected contracted service is snow removal and the expected weather amount is an expected amount of snow fall.

14. The system of claim 11, wherein the server is further configured to determine whether available resources are sufficient to satisfy the predicted dynamic resources.

15. The system of claim 14, wherein the server refers to a table stored in the memory listing the available resources, and the server compares the initial quantity to the available resources to determine whether the available resources are sufficient.

16. The system of claim 11, wherein the update comprises averaging the value of the initial quantity with the new value and setting the value of the initial quantity to a result of the averaging.

17. The method of claim 11, wherein the perform of the search comprises performing the search for the weather report at a first time to determine a first weather amount, performing the search for the weather report at a second later time to determine a second weather amount, and setting the expected weather amount to an average of the first and second weather amounts.

* * * * *